US008732595B2

(12) United States Patent
Schmidt et al.

(10) Patent No.: US 8,732,595 B2
(45) Date of Patent: May 20, 2014

(54) CONDITION EDITOR FOR BUSINESS PROCESS MANAGEMENT AND BUSINESS ACTIVITY MONITORING

(75) Inventors: Patrick Schmidt, Heidelberg (DE); Karsten Ploesser, Heidelberg (DE); Prashant Gautam, Rajasthan (IN)

(73) Assignee: SAP AG, Walldorf (DE)

( * ) Notice: Subject to any disclaimer, the term of this patent is extended or adjusted under 35 U.S.C. 154(b) by 439 days.

(21) Appl. No.: 11/655,307

(22) Filed: Jan. 18, 2007

(65) Prior Publication Data
US 2008/0178092 A1    Jul. 24, 2008

(51) Int. Cl.
*G06F 3/048* (2013.01)

(52) U.S. Cl.
USPC ........... 715/763; 715/736; 715/762; 715/769; 715/967; 715/968; 717/110; 717/112

(58) Field of Classification Search
USPC .......... 715/968, 967, 762, 769; 717/102, 110, 717/112, 127, 143
See application file for complete search history.

(56) References Cited

U.S. PATENT DOCUMENTS

| | | | | |
|---|---|---|---|---|
| 5,798,757 A | * | 8/1998 | Smith | 715/709 |
| 6,026,233 A | * | 2/2000 | Shulman et al. | 717/113 |
| 6,119,126 A | * | 9/2000 | Yee et al. | 707/3 |
| 6,339,838 B1 | * | 1/2002 | Weinman, Jr. | 717/104 |
| 6,463,442 B1 | * | 10/2002 | Bent et al. | 719/332 |
| 8,185,219 B2 | * | 5/2012 | Gilbert et al. | 700/83 |
| 2002/0100016 A1 | * | 7/2002 | Van De Vanter et al. | 717/112 |
| 2002/0184610 A1 | * | 12/2002 | Chong et al. | 717/109 |
| 2002/0196295 A1 | * | 12/2002 | Haley et al. | 345/968 |
| 2003/0033179 A1 | * | 2/2003 | Katz et al. | 705/7 |
| 2004/0031017 A1 | | 2/2004 | Vaidyanathan et al. | |
| 2005/0004911 A1 | * | 1/2005 | Goldberg et al. | 707/7 |
| 2005/0060684 A1 | * | 3/2005 | Gupta et al. | 717/105 |
| 2005/0240917 A1 | * | 10/2005 | Wu | 717/162 |
| 2007/0132779 A1 | * | 6/2007 | Gilbert et al. | 345/619 |
| 2007/0211079 A1 | * | 9/2007 | Nixon et al. | 345/619 |
| 2007/0276689 A1 | * | 11/2007 | Slone et al. | 705/1 |
| 2007/0294312 A1 | * | 12/2007 | Seshadri et al. | 707/200 |
| 2009/0119578 A1 | * | 5/2009 | Relyea et al. | 715/234 |
| 2009/0271472 A1 | * | 10/2009 | Scheifler et al. | 709/202 |
| 2010/0168874 A1 | * | 7/2010 | Lucas et al. | 700/17 |
| 2013/0179860 A1 | * | 7/2013 | Woock | 717/113 |

FOREIGN PATENT DOCUMENTS

EP    1691279    8/2006

OTHER PUBLICATIONS

Fujiwara, et al., "Using mathematical expressions in a statistical language", Computational Statistics and Data Analysis, vol. 52, No. 2, pp. 650-662 (2006).

(Continued)

*Primary Examiner* — Shen (Connie) Shiau
(74) *Attorney, Agent, or Firm* — Mintz Levin Cohn Ferris Glovsky and Popeo, P.C.

(57) ABSTRACT

A system for monitoring processes of a distributed business application an integration builder tool. The integration builder tool includes a condition editor having a user interface providing an editing area on a display in which to receive a text-based expression of one or more conditions of a business application process. The editing area further includes an operator palette providing a plurality of operators for use in the text based expression of each of the one or more conditions, and a toolbar providing one or more editing tools for editing the text-based expressions.

18 Claims, 9 Drawing Sheets

(56) References Cited

OTHER PUBLICATIONS

Wei Su et al., "MathEdit, a Broser-based Visual Mathematics Expression Editor", Technical Report ICM-200601-001, Kent State University, [Online], Retrieved from the Internet: URL:http://icm.mcs.kent.edu/reprots/2006/ICM-200601-0001.pdf> [retrieved on Feb. 24, 2009].

2006 Technical Reports: ICM-200601-0001, Reportss of ICM, Internet Site of Kent State University, Kent, Ohio, USA, [Online], Retrieved from the Internet: URL: http://icm.mcs.kent.edu/reports/> [retrieved on Feb. 24, 2009].

Osamu Takagiwa et al., "WebSphere Studio Application Developer—Programming Guide", excerpt (Chapters 1-6; pp. 1-160), Aug. 2002, XP055057548, ISBN: 978-0-73-842582-5. Retrieved from the Internet: URL: http://www.redbooks.ibm.com/redbooks/pdfs/sg246585.pdf [retrieved on Mar. 22, 2013].

Summons to Attend Oral Proceedings Pursuant to Rule 115(1) EPC, issued by the EPO dated Apr. 9, 2013.

\* cited by examiner

CONDITION EDITOR FOR BUSINESS PROCESS MANAGEMENT AND BUSINESS ACTIVITY MONITORING

BACKGROUND

This disclosure relates generally to computer-based mechanisms for monitoring activity of a business application, and more particularly to an infrastructure for monitoring local events of a distributed business application.

Business applications, such as CRM or ERP applications, usually lack communications necessary to be able to monitor business activity of the application. One comprehensive solution is the Business Activity Monitoring (BAM) provided by SAP AG to monitor events of business impact within an executing business application, and deduce actions if necessary. BAM can span both the applications of an application system landscape as well as the application orchestration layer, i.e. the integration processes.

A solution such as BAM introduces the notion of a monitoring process. A monitoring process collects events raised by diverse sources and deduces action items to be completed by business experts. Processes are predefined using an Integration Builder (IB) tool or the like, and work items are created as a consequence of process execution.

BAM knows a number of event systems and is capable of connecting them. Applications spawn workflow events (or local events) to trigger follow-up actions within one SAP system (client). BAM allows to map these local events via the local event infrastructure into global events (i.e. monitoring events) that can be communicated across system borders.

BAM also introduces the concept of a monitoring event. A monitoring event is a notification sent to the monitoring process about a significant state change in the business application system. In SAP's XI, the transport medium of monitoring events are XI messages, and the transport mechanism is the XI messaging infrastructure. BAM enriches the scenario of event resolution with stateful processes and correlation of monitoring events.

An application can discharge monitoring events using message communication, and therefore a monitoring event also represents a message interface that refers to message type, etc. Each already existing message communication can be used to supply monitoring processes with information. Additional monitoring events are necessary when no message communication exists already.

Events can be used to enable application systems to fire monitoring events to eventually produce an event resolution. Event resolution in a basic sense means that an application detects invalid business data or some deadline that has been reached in a workflow event, and an alert is dispatched. This alert will be used by an event resolution framework (i.e. an Event Resolution Center, or "ERC") to generate a resolution to the workflow event. Thus, the application alone must be able to detect the inconsistent or incorrect state of the application data. In some cases, the application will not be able to detect such inconsistencies because it may need additional data from other systems, or because one monitoring event alone does not lead to an alert that is visible to an end-user. In such cases, a monitoring process should be used.

Conditions defined in conventional tools such as an IB support only a subset of the functionality provided by the proven Business Workflow condition component. Both integration process designers and XI administrators configuring integration scenarios have been restricted by this limitation. The need for a unified condition definition and execution environment—one that provides the same set of functionality on all levels—becomes even more urgent in light of BAM.

Conditional behavior is an integral part of business monitoring processes. Designers require full expressiveness to compare key figures or deadlines in a meaningful way. The user currently has to normalize conditions before being able to define them in a definition tool, which is cumbersome when the condition exceeds a certain level of complexity. Conditions can cause runtime exceptions due to missing type checks in the definition environment.

Presently, a condition editor is used at various places in the IB for activities such as Receiver Determination., Interface determination and BPM. Condition creation is done in a tabular fashion using the following general rules: 1) For every new expression a new row is inserted into the table; 2) Only following operators are supported: =, !=, ~, EX; 3) Extra UI symbols are provided in the first column of the table to represent parentheses, however complex conditions become practically unreadable; 4) Nesting of parenthesis is not supported; and 5) A facility for using variables in a condition is not supported.

All this make the process of creating conditions complex and error prone with almost negligible help provided by the system. The number of operators that can be supported are very few, which fails the basic idea of providing users like process designers and XI administrators with a flexible, easy to use and full blown condition building experience. Hence, a need arises to have an extensive, easy to use and more readable condition editor UI.

SUMMARY

In general, this document discusses a condition editor system and method for providing extended conditions and expressions for business process management and business activity monitoring.

In one aspect, a system for monitoring processes of a distributed business application includes an integration builder tool comprising a condition editor. The condition editor has a user interface providing an editing area on a display in which to receive a text-based expression of one or more conditions of a business application process. The editing area further includes an operator palette providing a plurality of operators for use in the text based expression of each of the one or more conditions, and a toolbar providing one or more editing tools for editing the text-based expressions.

In another aspect, a condition editor for creating and deploying conditions for a business process activity monitoring system includes a computer having a display. The condition editor further includes a user interface generated by the computer and providing an editing area on the display in which to receive a text-based expression of one or more conditions of a business application process, at least one text-based expression including at least one operator and at least one variable, the editing area providing drag-and-drop editing of the text-based expression of the one or more conditions.

In yet another aspect, a condition editor for creating and deploying conditions for a business process activity monitoring system includes a computer having a display, and a user interface generated by the computer and providing an editing area on the display in which to receive a text-based expression of one or more conditions of a business application process, at least one text-based expression including at least one operator and at least one variable. The condition editor further includes a parser module adapted to check the semantic correctness of a condition object associated with each condition.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

Figure 1:
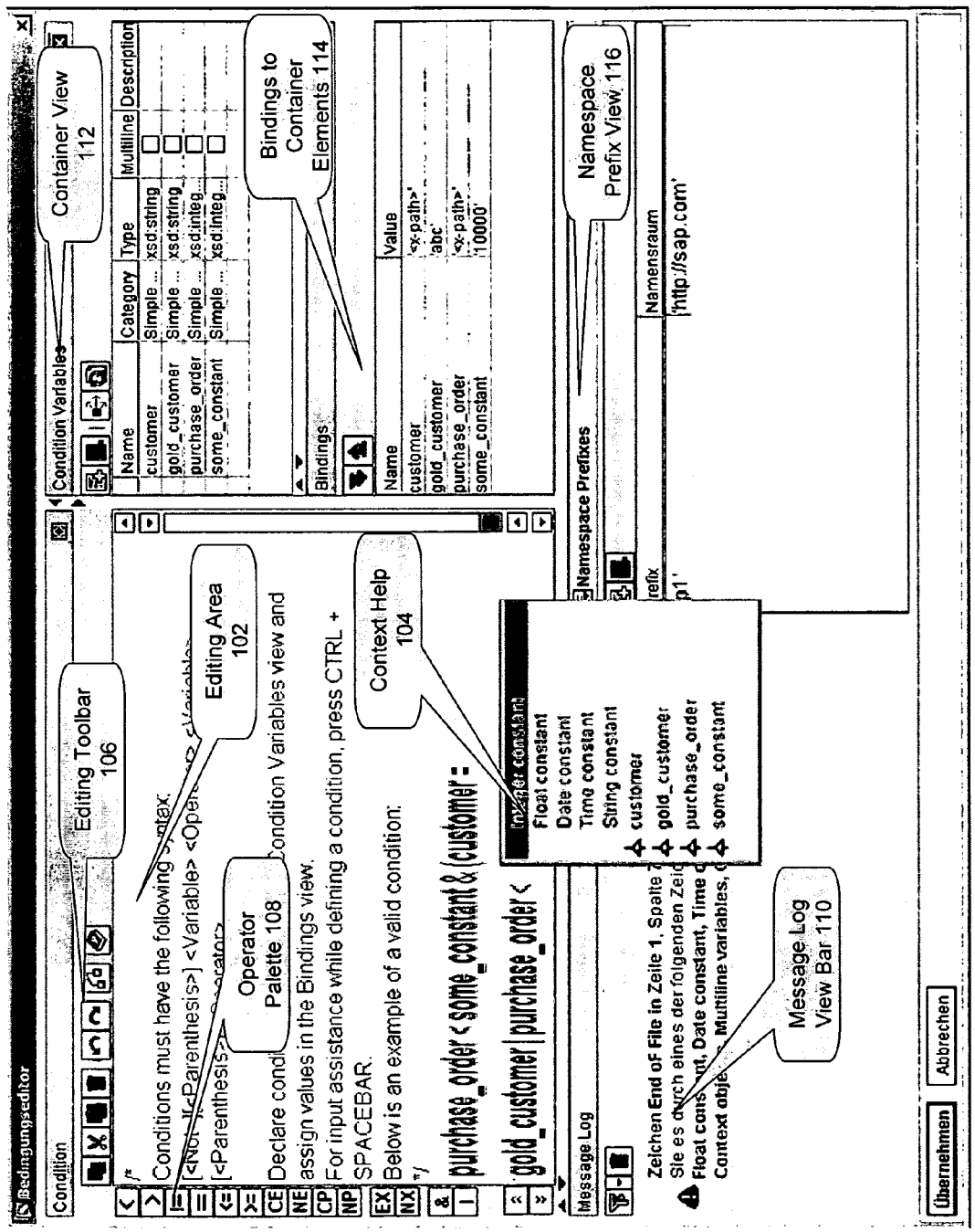
FIG. 1 is a screen shot layout of an editor view of a condition editor UI having a number of screen components.

This document describes a condition editor and condition editor user interface (UI) for business process management and business activity monitoring of executing business applications. In preferred implementations, the condition editor supports parsing the condition string as and when the condition editor UI requires, and provides information about syntactically and semantically erroneous conditions.

The condition editor includes a UI with easy to use features, a capacity to use more operators, and can use variables in a condition. The condition editor further includes editing features such as the ability to receive user-typed conditions, and provide appropriate help during the conditions creation process, including intelligence for possible operators/operands, drag and drop condition variables, and so on. The user can undo/redo changes made during editing the condition. Functions such as cut, copy and paste of part or all of a condition string and operands can be made within the editing area.

The condition editor provides readability by highlighting the operators and matching parenthesis, and performs a syntax and semantic check at the time of condition definition. The user can see the condition with semantically erroneous expressions highlighted. The set of operators supported by the Condition Editor UI is restricted, however the "escape" character (ESC) could be used to provide comments while building conditions (E.g. "* . . . *", "/* . . . */"). This text within the escape character would provide the user the facility to document the condition in the editor itself.

The condition editor can use more operators so as to be extensible for building complex conditions, provide all the operators supported by the Business Workflow condition component

TABLE 1

(partial list of usable operators)

| Operator | Description |
|---|---|
| CP/≈ | Pattern match (implemented by ABAP: CP) |
| NP/≉ | No pattern match (implemented by ABAP: NP) |
| < | Less than |
| <= | Less than or equal |
| > | Larger than |

TABLE 1-continued (partial list of usable operators)

| Operator | Description |
|---|---|
| >= | Larger or equal |
| CE | Table contains value(s), lhs is a superset of rhs |
| NE | Table does not contain value, lhs is NOT a superset of rhs |
| EX | A value exists (operator requires ONE operand) |
| NX | No value exists (operator requires ONE operand) |

The condition editor also includes a capacity to use variables. Each condition can be viewed as a set of operands and operators, where each operand is a value by itself. Instead of providing absolute values (long x-paths) repeatedly in the condition, an indirection can provide variables representing the values of operands, as explained more fully below.

A screen layout of the condition editor includes an editor layout. The editor layout is the default view for opening the condition editor. Depending on the calling application's mode (display or edit), conditions can be edited or viewed in this layout. The editor layout has the following views: Operators Palette, Editor View, Condition Variable View, Binding View, Message Log View, and Namespace prefix view. These views are explained in more detail below.

Two different tables (or views) are used for declaring and defining the variables to reduce the development effort by using an existing Container Panel and Property framework. The condition editor can include a unified table, where the condition variables can be declared and defined.

FIG. 1 is a screen shot layout of an editor view 100 of a condition editor UI having a number of screen components. The editor has a toolbar and text editing area for editing a condition. The screen components includes an editing area 102 for editing condition expressions. This area displays commented instructions or help for using the condition editor, when invoked for the first time (i.e. empty condition editor).

Creation of a condition in the editing area 102 can be done by a "drag and drop" of a variable, operator or parenthesis. The user can drop any variable or operator at the cursor position. In a specific implementation, an open parenthesis "(" means that the variable is droppable at any cursor position and the condition editor could automatically insert a closing parenthesis ")" at the first next syntactically correct position in the condition. For example, in the condition "a=b", if the user drops an open parenthesis ("(") before "a", a close parenthesis (")") will be inserted after "b". Likewise, a close parenthesis ")" can be dropped at any cursor position and the condition editor will automatically insert an open parenthesis "(" at the first previous syntactically correct position in the condition. Using the example above, in the condition "a=b", if the user drops a close parenthesis (")") after "b", an open parenthesis ("(") will be inserted before "a".

The user can type in freely to the editing area 102 in any text-based expression, and condition text is preferably case insensitive. If the user types in a valid variable (i.e. available in condition variables), the condition editor will highlight the variable as valid. If the user types in an invalid variable (i.e. not available in condition variables), the condition editor will highlight the variable as invalid. The condition editor treats typed-in open/closed parentheses similarly to parentheses that have been dragged and dropped, as described above. Valid operators are highlighted as valid, while invalid operators are highlighted as invalid.

Deletion of text from the editing area 102 can either be done by using the toolbar delete button (select and click "delete") or other editing ways (i.e. using Back Space or Delete keys). If the user tries to delete an operand/operator, the condition editor will display a appropriate message indicating a probable error. If the user tries to delete a parenthesis, the condition editor could highlight the first matching parenthesis and hence indicate the mismatched parenthesis.

For other editing functions, a selected string can be dragged from one position in the editing area 102 and dropped to another. The condition editor also includes an undo/redo function for changes made in a condition. The "Undo" button removes the last change made in the editing area, and the "Redo" button adds the last change made in the editing area.

Condition editor has a function to provide comments while writing conditions. In one implementation, the "/*" symbol is used to start the comment, and the "*/" symbol is used to close a comment, although other symbols or representations can be used. Comments are visible at design time and in the condition definition produced by the cache import, but do not have any runtime impact.

While building a condition, the condition editor provides the user a context help 104 function. The context help 104 can include a popup that is displayed in response to receipt of a command such as "Ctrl+Space" or other key commands. When requested, the condition editor displays a popup with a list of all possible values at the current cursor position from which the user can select. This help function can assist the user find a next possible operator, operand or parenthesis. If the cursor position is after an operand or parenthesis, and the user requests for help, the popup is displayed with all the possible operators and parentheses (unary, binary and parenthesis). The selected operator is inserted at the cursor position. If the cursor position is after an operator, the popup display a list of all possible operands (i.e. condition variables of same type), and the selected operand is inserted at the current cursor position. If a cursor position is in between an incomplete operand (substring of container element name), a popup should be shown with all the possible operands (same type) starting with the same substring, if there are multiple container elements starting with this substring. If there is only one matching variable starting with the typed-in substring, the rest of the string is completed with the matching variable.

To replace an existing operator or operand, if the cursor position is before an operator/operand, the popup displays a list operators/operands of same type (i.e. a binary operator should not be replaced by a unary operator). The condition editor will replace the selected operator/operand for the operator/operand at the current cursor position. To get help for all the possible context objects for a given condition variable, the user can ask help for all possible context objects of a message by typing in "<message-variable>"+Ctrl+Space. Message variables are inherited from the parent context (e.g. block level container of an integration process). Syntactic correctness of the condition can be checked at a specified threshold after the user has stopped editing. The output of this check can be displayed in the editing area 102. A time lag can be inserted to ensure that the user is not regularly interrupted with a message while editing. Each update will clear the previously displayed message.

The editor view 100 further includes a toolbar 106. The toolbar 106 includes a number of functional buttons to execute such functions on a selected operand, operator and/or parenthesis as delete, check condition, and undo/redo. When the check condition button is clicked, the condition editor checks syntax and type, and will highlight type-mismatched operands, and display an error message. The corresponding entry of the variable is highlighted in the container view. Valid/invalid condition variables/operators are highlighted to identify available variables and supported operators. Matching parenthesis are highlighted when the cursor is positioned before an open parenthesis and after a close parenthesis. Parenthesis mismatch is also highlighted. Shortcut keys can be provided for simple editing within the text editing area, such as Cut, Copy and Paste text.

The editor view 100 also includes an operator palette 108 to display a list of draggable supported operators with a separator that identifies a classification (like Binary, Unary). A message view 110 displays all the syntactic and semantic error messages generated while creating a condition. The error message indicates the most probable position for the error in the condition. Clicking on an error message puts the cursor to the indicated position in the editing area 102.

A container view 112 includes condition variables (container elements) where declaration and definition is divided into two parts: a condition variable view (declaration) and a binding view (defining bindings). The condition variable view has a toolbar and a table containing the condition variable. The toolbar can include a number of functional buttons, such as Add Row, Remove Row, and Where Used. The Where Used button highlights all the places where a particular container element is used in a condition.

In addition to the toolbar, the container view 112 includes a table of container elements. The user can create (by adding a new row) and use the container elements (in editing area). The user can also create container elements by providing a name and a type to a container element. Each container element can be modified and/or deleted if necessary, and can be dragged into and dropped in the editing area 102. Specified rows of each container can be highlighted. Container elements can be of XSD simple types. (e.g. date, time, string and integer). Container elements can be passed while invoking condition editor, and none of their attributes can be changed within the scope of the condition editor.

A binding view 114 is used to define the condition variables declared in the condition variable view, as described above. The binding view 114 displays a table containing variable name and value pair. The condition editor automatically updates the variable declared in the condition variable view, such as by adding, modifying (type change) or deletion. The user can bind values (constants and x-path) to variable using an expression editor, but cannot delete or modify the variable name in this view. Also, the user may not assign one local variable to another.

Possible values for a variable could be a constant, where the user provides a constant value according to the type of container element, or an expression (x-path/context object). The condition editor provides a popup to the expression editor to set the value of the container element. All the information required by the expression editor will be provided (such as execution context, extract context, etc.). The bindings view 114 includes a namespace prefixes view 116 to display all the prefixes used in the x-path expressions (used in variable definition). The namespace prefixes view 116 will display editable prefix name and non-editable value pairs. The condition editor can configure the set of operators required or used by the application from the available set operators in a condition editor API.

The IB tools allow users to create and activate objects. Every object obtains a unique object identifier and the IB versioning mechanism tracks changes to that object. Conditions are defined and interpreted in the context of such objects, and need to be unique only in that context so that no condition-specific versioning information is required. Conditions depend on design objects, but do not possess design object qualities. Hence, the lifetime of a condition is closely coupled to that of its host object. Conditions can only be created, persisted and read if such a hosting object exists. Hence, upon deletion of the host object, its conditions will also be deleted and not reused over a number of design objects. Furthermore, the distinction between client-side and server-side components in IB requires all objects—including dependent ones—to support the Java object serialization mechanism.

The IB framework requests a number of functions that are implemented by the following core services: persistence of in-memory condition instances; serialization of in-memory condition instances; and migration of existing condition instances.

Figure 2:
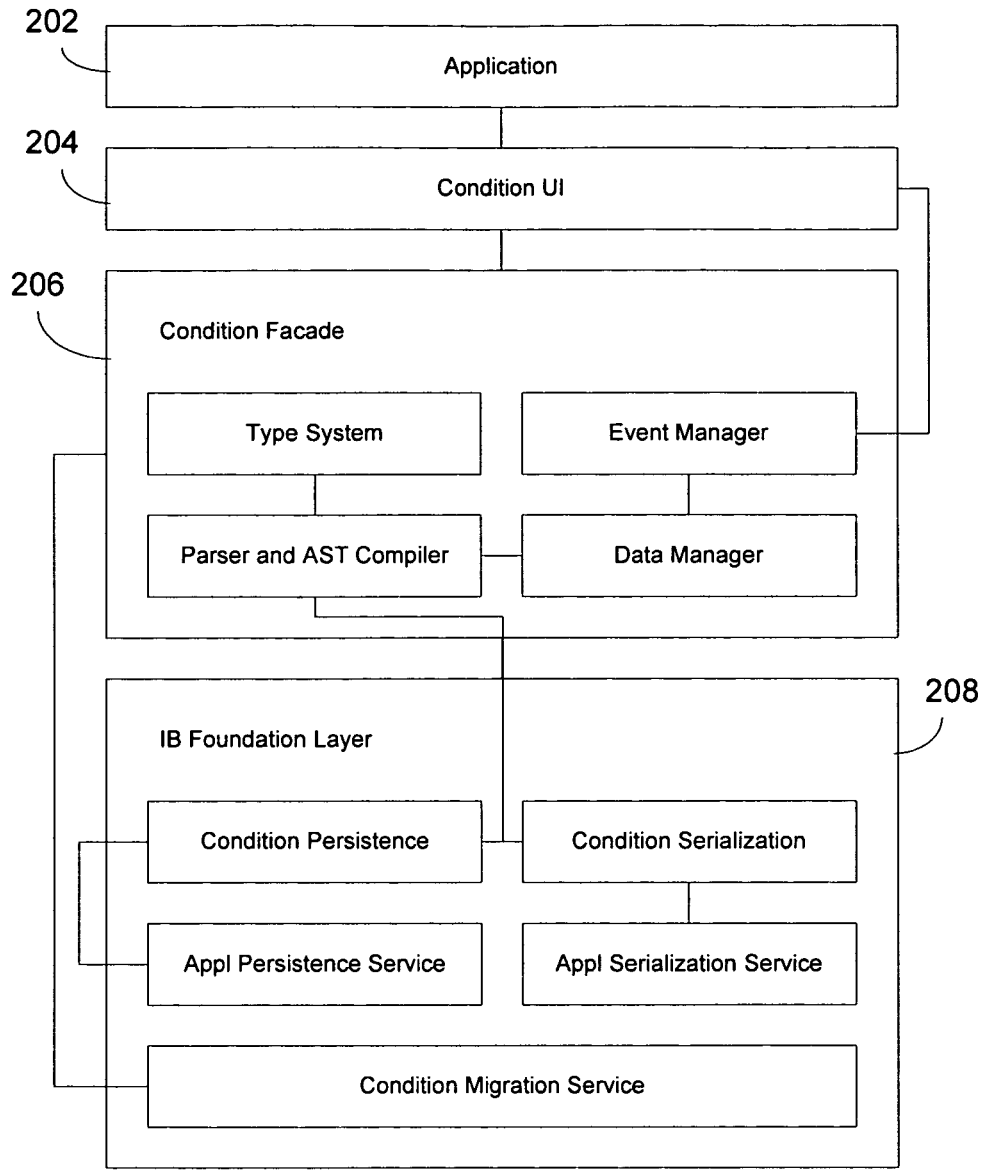
FIG. 2 depicts the subsystems and services of the condition model.

FIG. 2 depicts the subsystems and services of the condition model 200, and how they relate to one another as well as to surrounding layers. The condition model 200 includes an application layer 202, a condition UI layer 204, and a condition façade layer 206. The condition façade layer 206 provides a type system, an event manager, a parser, and a data manager. The condition model 200 further includes an integration builder (IB) foundation layer 208, providing condition persistence, condition serialization, an application persistence service, and an application serialization service. The IB foundation layer 208 also provides a condition migration service as an interface to the condition façade layer 206. The condition model 200 is used by different applications in the context of Integration Builder Repository and Directory. These applications have different requirements on how the model should function. Hence, the condition model 200 is flexible. Applications will be in a position to enable or disable features of the condition model 200 based on their requirements. This is discussed in further detail below.

Figure 3:
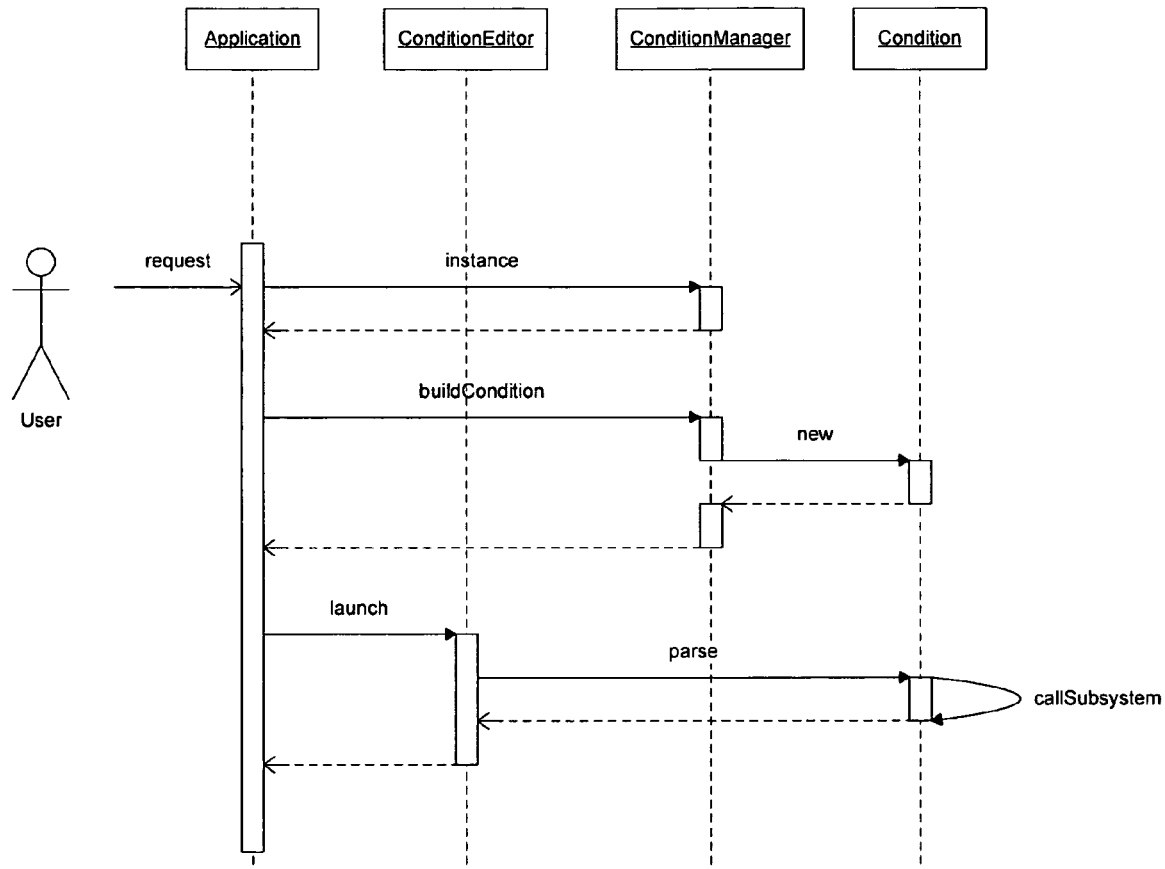
FIG. 3 illustrates a call sequence showing how a request is passed from an application to the condition model.

FIG. 3 illustrates a call sequence 300 showing how a request is passed from an application to the condition model 200. The single point of entry is the Condition Manager which can be customized to satisfy the requirements of an application. The Condition Manager incorporates grammar settings (e.g. supported operators) and extractor settings (e.g. context object types etc.).

Once configured, a ConditionManager instance can be requested to construct condition instances according to its configuration. After obtaining such an instance, the application provides the input stream to be parsed. From an application point of view, this is the finest level of granularity. The actual implementation of the condition instance behavior is not visible from the outside. The parse routine results in an abstract syntax tree represented by the ConditionSyntax-Tree. Next to it, a condition instance holds variable declarations and instantiations in the form of a Container and PropertySet (discussed further below).

Figure 4:
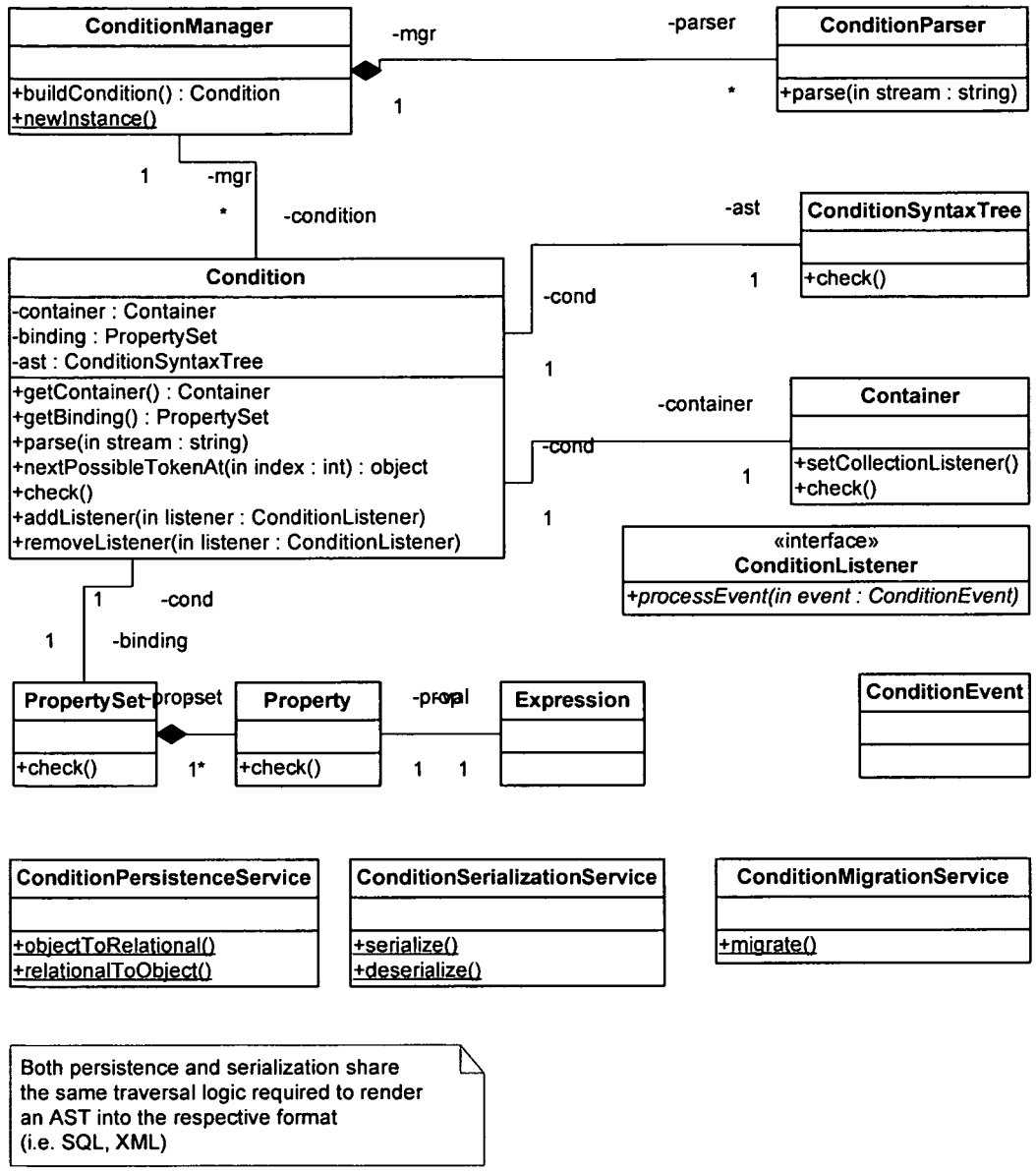
FIG. 4 illustrates condition model classes.

The only way for an application to manipulate the state of this instance is by either having it parse a new input stream or by setting new container elements and the respective bindings. In the event of a change, the notification mechanism is triggered to inform subscribers about the state transition. FIG. 4 illustrates condition model classes.

A formal language is a set of finite character strings. These character strings are composed from the members of a finite alphabet set, usually according to a set of rules that specifies their production. A formal grammar is a system that specifies/abstracts over such a formal language: the grammar thus differentiates between strings that belong to the formal language and those that do not. A grammar imposes a structure on the language it generates. Strings derived from the grammar are consistent according to the rules of the Grammar. The morphemes (henceforth referred to as tokens) are available to the processor, along with their relationship to each other. The structure is especially crucial to an automatic processor.

Conditions, being a language construct themselves, are subject to this formal treatment. Accordingly, a condition follows a set of rules which can be represented by the condition grammar. A parser then interprets the condition against these rules. The formal approach (and the automatisms that the formality generates) results in the following advantages:

Error detection: the input stream could be in error. Depending on the sequence on the token encountered so far and the matching production rules, the parser can anticipate the set of next possible tokens. If the scanned token is not from this set, the input string is in error as per the grammar.

Input suggestion: The set of possible tokens discussed above can also be used to suggest a valid possible next token in the input string that is encountered so far. This is of interest for UIs such as the condition editor, where the user inputs the string that represents a condition.

Figure 5:
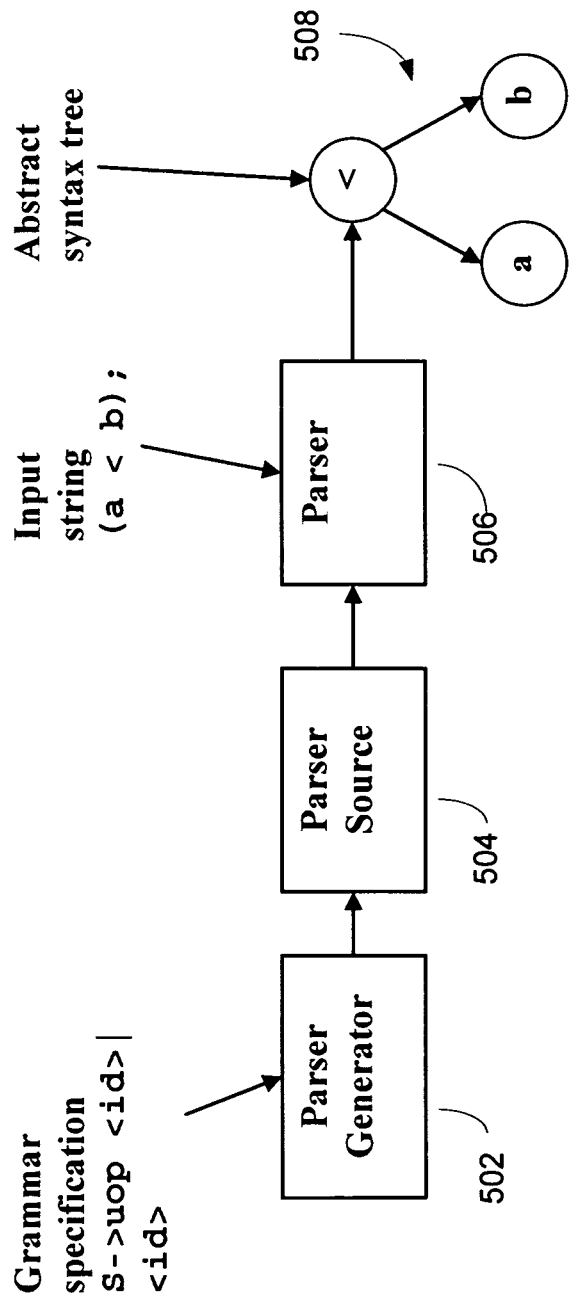
FIG. 5 illustrates a parser generator and abstract syntax tree product thereof.

Parsing theory is well-understood, and parsers for computer programming languages, its sub-constructs, such as the condition described in the previous section, are rarely written by hand. Instead they are more often generated, by programs called parser-generators (also referred to as compiler-compilers). As shown in FIG. 5, a parser-generator 502 acts on the input grammar specification (parser source 504) to produce the source code of the parser for that grammar. The generated parser 506 can then be augmented—by means of the same formal specification—so that it constructs an Abstract Syntax Tree 508. This will serve as input to the type system as described below.

The advantages of using a parser-generator over hand-crafting the parser include the parser being independent of its implementation. Thus, the production rules are easily separable instead of being buried in the code. As a consequence, the actualization of the changes in the grammar in the parser implementation is comparatively lower. This approach also saves considerable effort in the development of the parser (and avoids the errors that may creep in during hand-crafting). Finally, the generation approach is a widely adopted practice; as amply demonstrated by the success of Parser Generator and lexical analyzer tools such as YACC and LEX, respectively.

The user needs access to message data, context objects and constant values when defining a condition. The new condition model will retain direct input of context objects and constant values, but will not allow direct input of XPath expressions. This is replaced by the concept of local variables. Such variables are defined and used only within the context of a particular condition.

The advantage of this approach is that it greatly helps a user in creating the condition. The user is relieved of having to input an XPath repeatedly. Instead, the user defines a variable once (e.g. totalValue), assigns a type to it (e.g. xsd:int) and then uses it throughout the condition (totalValue<10.000). At the same time, the user has access to all container elements defined in the host object (in case it provides a container of its own). In case of elements derived from the type xsd:simpleType, the user can directly drag them into the condition. In case of message elements, only context objects can be referenced in the editor.

The container and property model provide a proven means to model data declarations and bindings. Thus, a condition object hosts a container object to represent variable declaration and a property set object to define data bindings. The data manager encapsulates access to the respective APIs as well as provide additional functionality such as data format parsing.

Containers provide a simple means to declare variables. The user introduces a new symbol by assigning a name and a type to it. A variable name is unique, i.e. there may only be one instance of a name in a given container context. Container instances can be linked to form a hierarchy. If an object has a container of its own, it may set this container as the parent of the condition container. Hence, all elements of a type derived from xsd:simpleType or a message type (in case of ccBPM) of its container will also be accessible in the condition. In addition, container eventing can be used to propagate changes in the container hierarchy. The condition instance receives and processes events by both the parent container as well as its own container.

Values in the Integration Builder are expressed by means of expressions (an XPath expression, a reference to a value contained in another container element or a constant). Two solutions are possible when trying to conceive the assignment of a value to a variable. In one solution, the value expression is made part of the variable declaration. This requires a capacity to store expressions in the container which breaches the paradigm used so far in this domain, i.e. to separate variable declaration from value assignment. Another solution is to introduce an indirection. Variable declaration can be represented by means of a container. A set of properties can be used stating that for any container element e, there is a property p. This leads to the conclusion e=p(x) where x is the value to be assigned.

In other terms, a binding definition is a set of properties, each assigning a value (i.e. an XPath expression, a value contained in another container element or a constant) to a declared variable in a container. The user will have to define a binding for all local variables. If this is not the case, the condition will not pass the checks implemented by the model. Since local variables are only a modeling construct, they are mapped to so-called named expressions before being transported to the cache import routine. A named expression in the condition serialization format has an additional name attribute. The serialization routine sets the container element name as the value of this attribute.

Elements in a container need to follow a naming scheme. In some exemplary implementations, the naming scheme is specified as follows:

["a"-"z", "A"-"Z", "_"](["a"-"z", "A"-"Z", "0"-"9", "_"])*

An example container element name is:
variable 1
Names not complying with the naming scheme will not be accepted by the API.

The type system identifies correct data formats. As the IB framework heavily relies on XSD types, it is only logical to impose the XSD data formats as well. Finally, XSD string format supports an arbitrary sequence of characters. To distinguish it from other formats, the sequence should be enclosed by quotation marks. Given an input stream, the data manager is able to both ensure format compliance as well as derive the type. This information can then be processed by the type system.

As a condition instance acts autonomously, the hosting application and other possible stakeholders subscribe to it to be informed about otherwise internal state changes. The condition event manager extend the proven concepts already in place in the container eventing API. In addition, it will feature event propagation. This mechanism is required to deliver events raised by the underlying container eventing API to subscribers. In a client/server-environment, subscribers are treated as transient objects. As the condition event manager cannot enforce that its subscribers are serializable, it must discard them before being sent back and forth between client and server.

A type system defines type relations and operator semantics and introduces a naïve type system to compute the semantic correctness of an abstract syntax tree. The type system is motivated by the requirement to assist users in pinpointing type errors and deduce missing information (i.e. not provided by the user) such as variables and variable types.

After parsing the input stream, an abstract syntax tree consisting of token instances is obtained. These instances are organized in a hierarchy that defines how the condition will be interpreted. The type checks are not incorporated into the actual creation of the tree. That way, even conditions containing invalid type assignments can be rendered as tree.

A type check needs to satisfy the following criteria: the number of operands of an operator equals its declared arity; the type of a given operand is a member of the types accepted by its operator; and mapping the type of one operand to that of another can be successfully computed using one of the operator's type mapping function.

The generated tree passes the type check if its elements satisfy these criteria. Each element has a set of attributes needed to determine if it is compliant. These are: Return type (all elements); Arity (only operator elements); and Type range (only operator elements). In addition, operator elements provide a set of type functions that describe possible mappings of operand types.

Figure 6:
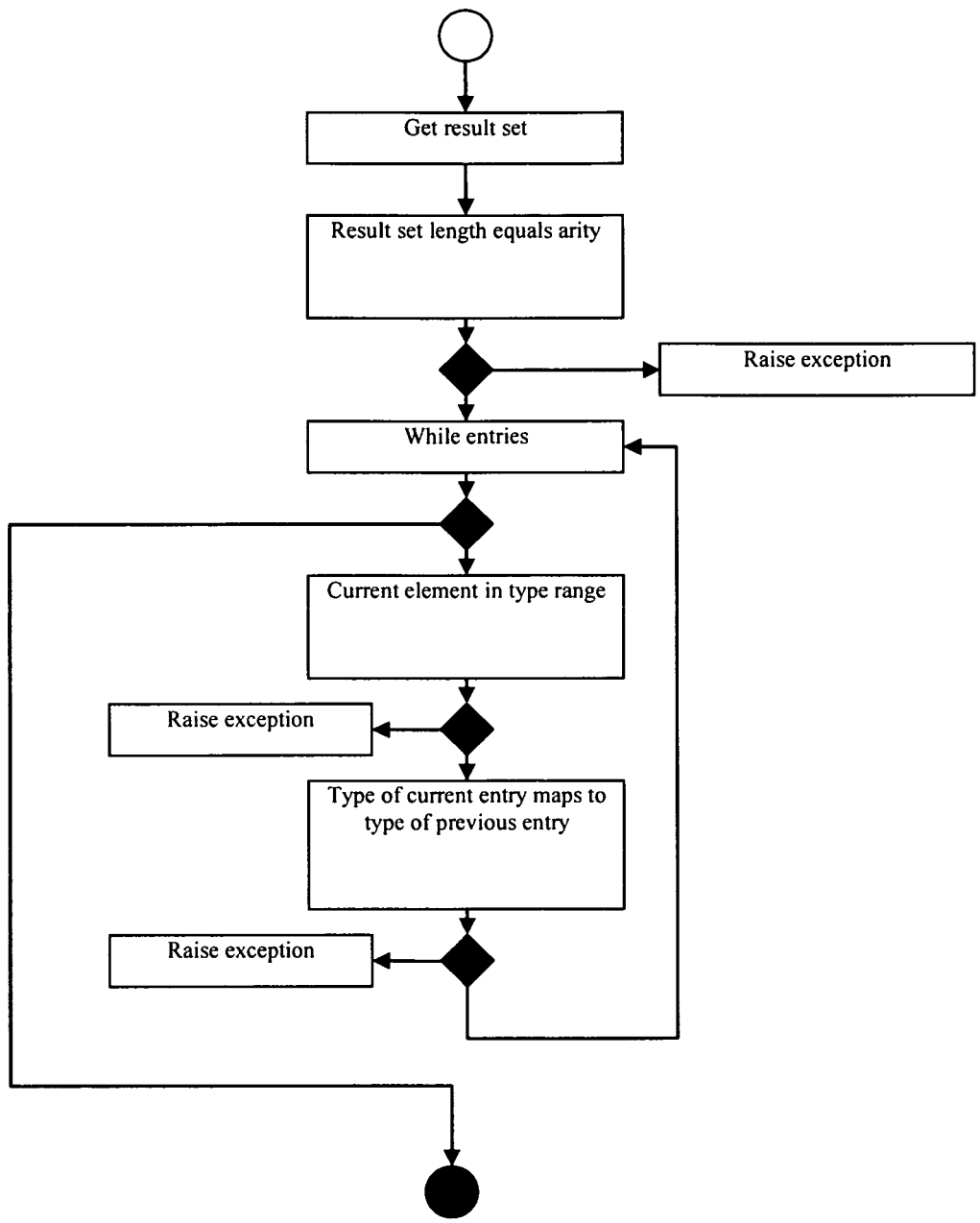
FIG. 6 illustrates an attribute query algorithm.

As shown in FIG. 6, an algorithm 600 queries these attributes to compute if the condition is correct with respect to type safety. The algorithm can also be used to deduce the type of certain elements. This can be helpful to assist the user by automatically typing elements that the user has not specified. When the algorithm encounters such an element, it will determine its return type attribute based on the return type attributes of the previous sibling. The generic type mapping function can be described as: a more specific type takes precedence over a more generic type. Specific types cannot be mapped onto each other whereas generic types can be mapped onto specific ones under certain circumstances.

Where the mapping might result in a dump at runtime, a warning message is displayed for the user during design time. Where the mapping might result in an exception, an information message is displayed.

Certain operators allow comparison of sets against single elements. Although the type mapping rules do not change, the way the type is determined differs. In such a situation, the type of the element is mapped onto the base type of the set. Consider a set of entries of type xsd:integer. The single element will accordingly have to be either of type xsd:integer or may also be of type potentially castable to xsd:integer, such as xsd:string. The latter implies that a warning message is generated and displayed but the condition can still be activated.

Figure 7:
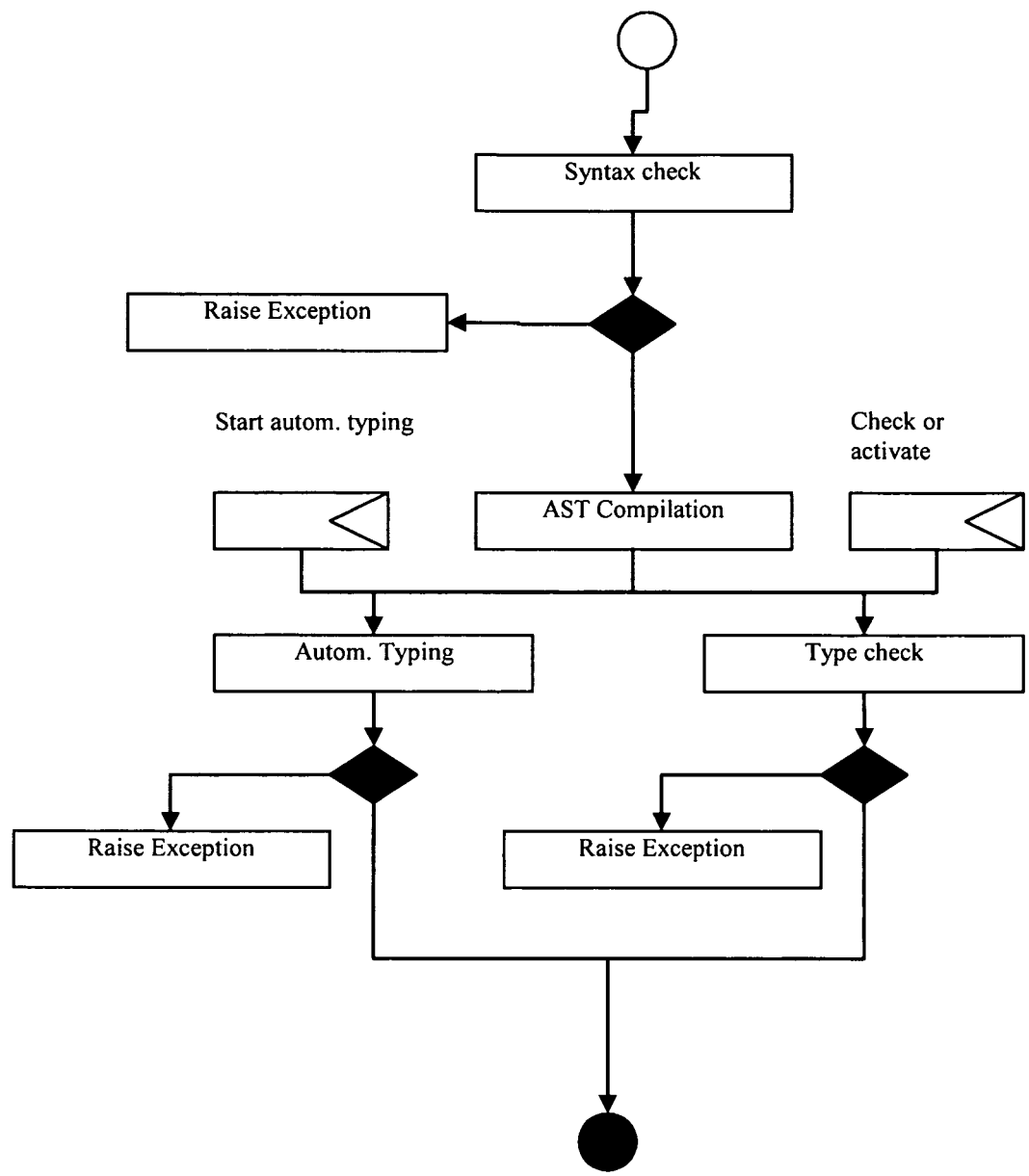
FIG. 7 shows the stages of a condition.

A condition goes through certain stages, as illustrated in FIG. 7. If the condition fails to pass to the next stage, it cannot be activated. These stages are: 1) Syntax check; 2) AST Compilation; and 3) Type check. A user may also decide to employ automatic typing to support creation of the condition. This can have three possible outcomes: A) Successful; B) Failed; or C) Undetermined (the automaton was unable to fully compute all the attributes). Once automatic typing has finished, the condition again has to pass the stages mentioned above.

The type system deals with proving the semantic correctness of a condition, not with specifying the type of a variable or a constant. This is provided by the data manager. The data manager will provide information about each operand token, be it constant or variable. It will return the type and occurrence (i.e. multiline or singleline) of each token, and it maintains variable declarations to parse and assign a type to constant expressions such as an integer of timestamp.

The condition model provides a persistence mechanism, which allows storing the condition objects on a relational database. In certain exemplary implementations, conditions are not subject to XI object versioning and do not possess a global XI unique identifier. As a consequence, they need to inherit that information from the XI object to which they belong. In addition, each condition object obtains an identifier which is unique in the context of a given XI object. This triple of identifiers is required to establish a link between a given condition instance and its owner.

At the same time, this implies that the lifecycle of a condition object is bound to its owner—and so is persistence. A condition object is stored when its host object is stored; it is deleted when its owner is deleted; and so forth. The XI object's persistence will delegate this task to the condition persistence.

The condition persistence service fully supports the IB generic persistence (GP) framework, providing persistence service implementation, required relational database tables for the IB Repository and Directory, and a method to enrich GP meta information objects of the calling application (e.g. Integration Process, Receiver Determination, etc.).

An application registers the condition meta information to its own meta information object by calling the method provided by the condition persistence implementation. Furthermore, when the persistence implementation of the application is called, it delegates this call to the condition persistence in order to store or retrieve condition instances. As a consequence, it need not deal with the exact details of condition persistence but can rely on the condition persistence to do so. XML Serialization is used in IB framework to either transport design objects from one system to another (e.g. DEV to PROD) or into the runtime cache. The condition model provides one common serialization format which will be used for both use cases.

Similar to persistence, condition objects cannot be rendered into an XML string on their own, but require the context of the XI object and hence the condition serialization is nested in the XML stream of that object. The serialization routine appends versioning information of the schema used to serialize a condition object so one can distinguish between current versions and deprecated formats.

The IB provides an upgrade framework wherein the condition migration service is registered. An upgrade will be performed in the application server migration mode, i.e. a number of framework services are not available. Accordingly, the migration of conditions is restricted to loading content in the old database tables and migrating content to the new database tables. The upgrade service loads conditions using the old API, convert them in-memory to an object instance as specified by the new condition model and persist them using the new persist service.

Figure 8:
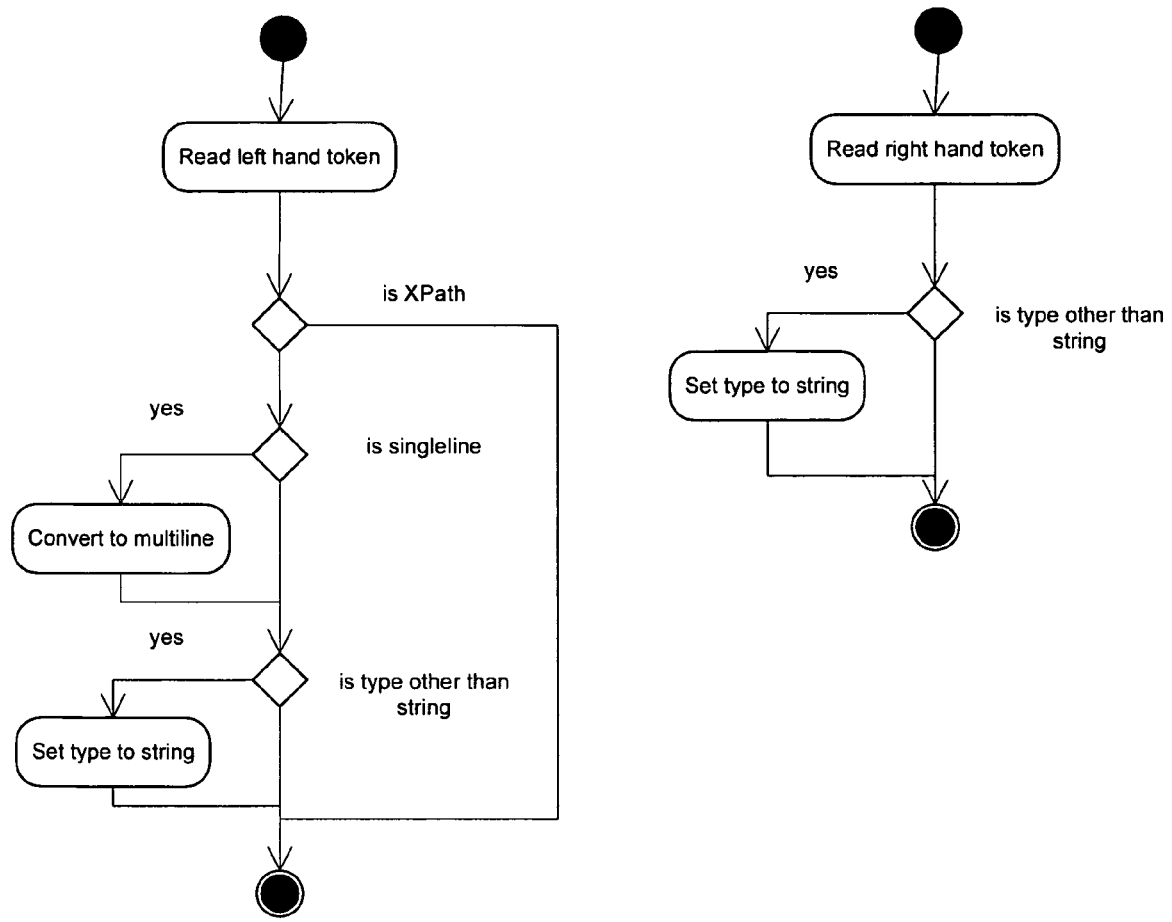
FIG. 8 shows a conversion algorithm for operands.
Figure 9:
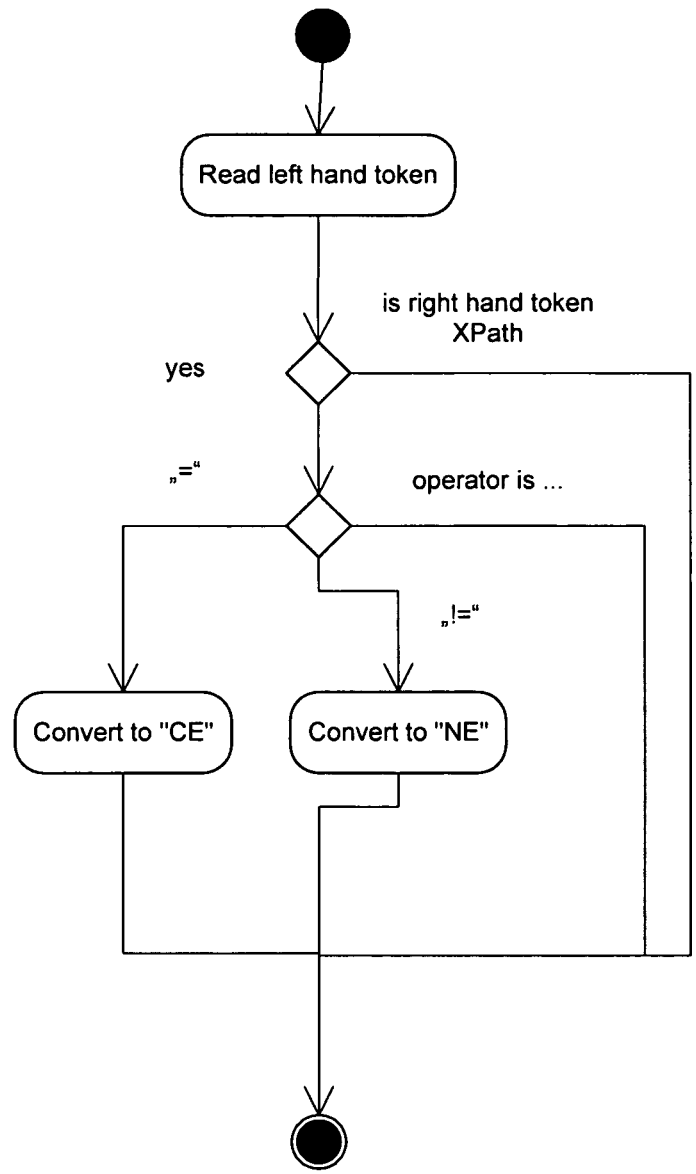
FIG. 9 shows a conversion algorithm for operators.

Additional work could be required in case of conditions that were defined in IB Directory (e.g. Receiver Determination). Such conditions need to be translated since the condition engine handles them in a more tolerant way. This conversion will not alter the semantics of the condition. It will simply represent the condition in the way the condition engine internally interprets it. Accordingly, the runtime behavior of the condition does not change. FIG. 8 shows a conversion algorithm for operands. FIG. 9 shows a conversion algorithm for operators.

Conditions defined in integration processes do not require this translation as the runtime interprets them exactly in the way they are defined. Such conditions will simply be converted into the new object model and stored in the new persistence layer. In some cases, a type check of the migrated condition might fail. In such cases human intervention is required. The migration service creates log entries to inform an administrator that such additional work is required.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A system for monitoring processes of a distributed business application, the system comprising:
    at least one processor; at least one display screen connected with a computer that hosts an integration builder tool comprising
    a condition editor, the condition editor having a user interface,
    the user interface comprising an operator palette, an editor view, a condition variable view, a binding view, and a message log view, the editor view providing an editing area on a display in which to receive a text-based expression of one or more conditions related to a workflow of an executing business application process,
    the text-based expression including at least one variable, the one or more conditions being associated with respective one or more monitored events in the executing business application process and configured to provide corresponding alerts in the message log view when the respective one or more events are detected, the editing area further including the operator palette providing a plurality of operators for use in the text based expression of each of the one or more conditions, the condition editor displays a pop-up window including a list of all possible values, operators, parenthesis, or operands for insertion at a current cursor position while building the one or more conditions,
    a toolbar providing one or more editing tools for editing the text-based expressions to build complex conditions for monitoring the workflow of the business application process,
    the at least one variable being defined in the binding view and declared in the condition variable view, the one or more conditions depend on existence of at least one corresponding object within the distributed business application and upon deletion of the at least one object, the one or more conditions corresponding to the at least one object are deleted,
    wherein the condition editor highlights the at least one variable as a valid variable if the at least one variable is valid and the condition editor highlights the at least one variable as an invalid variable if the at least one variable is invalid,
    the binding view providing binding of values to the at least one variable, wherein a deletion or a modification of at least one variable is not allowed in the binding view,
    the condition editor having a functionality to provide at least one comment while writing one or more conditions, wherein the at least one comment is visible at a design time and has no impact at a runtime.

2. A system in accordance with claim 1, wherein the condition editor further includes a context help function for providing possible context objects for a selected condition, each possible context object being at least one of one or more operators of the one or more conditions, one or more operands of the one or more conditions, and one or more parentheses of the one or more conditions.

3. A system in accordance with claim 1, wherein the text-based expression of at least one condition includes nested parentheses.

4. A system in accordance with claim 1, wherein the condition editor further provides a container view in the user interface, the container view displaying one or more container elements, each container element declaring and defining the at least one variable of the text-based expression, the container view including the condition variable view and the binding view.

5. A system in accordance with claim 1, further comprising a condition editor application programming interface providing the condition variable view for defining and configuring the plurality of operators provided in the operator palette.

6. A system in accordance with claim 1, wherein the condition editor further includes a message log in the user interface to display syntactic and semantic error messages that are generated while a condition is being created in the editing area.

7. The system of claim 1, further comprising: a parser configured to organize the one or more conditions into respective one or more tree-based hierarchical structures defining how the one or more conditions are to be interpreted.

8. A condition editor for creating and deploying conditions for a business process activity monitoring system, the condition editor comprising: at least one processor; a computer having a display; and
a user interface generated by the computer, the user interface comprising an operator palette, an editor view, a condition variable view, a binding view, and a message log view, the editor view providing an editing area on the display in which to receive a text-based expression of one or more conditions related to a workflow of an executing business application process,
the one or more conditions being associated with respective one or more monitored events in the executing business application process and configured to provide corresponding alerts in the message log view when the respective one or more events are detected,
at least one text-based expression including at least one operator and at least one variable,
the editing area providing drag-and-drop editing of the text-based expression of the one or more conditions to build complex conditions for monitoring the workflow of the business application process, the user interface displays a pop-up window including a list of all possible values, operators, parenthesis, or operands for insertion at a current cursor position while building the one or more conditions,
the at least one variable being defined in the binding view and declared in the condition variable view, one or more conditions depend on existence of at least one corresponding object within the distributed business application and upon deletion of the at least one object, the one or more conditions corresponding to the at least one object are deleted,
wherein the user interface highlights the at least one variable as a valid variable if the at least one variable is valid and the user interface highlights the at least one variable as an invalid variable if the at least one variable is invalid,
the binding view providing binding of values to the at least one variable, wherein a deletion or a modification of at least one variable is not allowed in the binding view,
wherein the user interface having a functionality to provide at least one comment while writing one or more conditions, wherein the at least one comment is visible at a design time and has no impact at a runtime.

9. A condition editor in accordance with claim 8, wherein the operator palette provides a plurality of operators for use in the text based expression of each of the one or more conditions.

10. A condition editor in accordance with claim 8, wherein the editing area further includes a toolbar providing one or more editing tools for editing the text-based expressions.

11. A condition editor in accordance with claim 8, further comprising a container view in the user interface, the container view displaying one or more container elements, each container element declaring and defining the at least one variable of the text-based expression, the container view including the condition variable view and the binding view.

12. A condition editor in accordance with claim 8, further comprising a condition editor application programming interface defining and configuring the plurality of operators provided in the operator palette.

13. A condition editor in accordance with claim 8, further comprising a message log in the user interface to display syntactic and semantic error messages that are generated while a condition is being created in the editing area.

14. A condition editor in accordance with claim 8, wherein at least one text-based expression includes nested parentheses.

15. A condition editor for creating and deploying conditions for a business process activity monitoring system, the condition editor comprising: at least one processor; a computer having a display;
a user interface generated by the computer, the user interface comprising an editor view, a condition variable view, a binding view, and a message log view,
the editor view providing an editing area on the display in which to receive a text-based expression of one or more conditions related to a workflow of an executing business application process,
the one or more conditions being associated with respective one or more monitored events in the executing business application process and configured to provide corresponding alerts in the message log view when the respective one or more events are detected,
at least one text-based expression including at least one operator and at least one variable, the user interface displays a pop-up window including a list of all possible values, operators, parenthesis, or operands for insertion at a current cursor position while building the one or more conditions,
the at least one variable being defined in the binding view and declared in the condition variable view, the one or more conditions depend on existence of at least one corresponding object within the distributed business application and upon deletion of the at least one object, the one or more conditions corresponding to the at least one object are deleted,
wherein the user interface highlights the at least one variable as a valid variable if the at least one variable is valid and the user interface highlights the at least one variable as an invalid variable if the at least one variable is invalid,
the binding view providing binding of values to the at least one variable, wherein a deletion or a modification of at least one variable is not allowed in the binding view;
wherein the user interface having a functionality to provide at least one comment while writing one or more conditions, wherein the at least one comment is visible at a design time and has no impact at a runtime; and
a parser module adapted to check the semantic correctness of a condition object associated with each condition.

16. A condition editor in accordance with claim 15, wherein the parser module is further adapted to check the syntax, compile the file extension, and check the type of each condition object.

17. A condition editor in accordance with claim 16, further comprising a persistence mechanism to store each condition object on a relational database.

18. A condition editor in accordance with claim 17, further comprising an integration builder tool adapted to use selected condition objects from the persistence mechanism to display the associated condition as the text-based expression in the editing area.

* * * * *